US012292061B2

(12) United States Patent
Shimada

(10) Patent No.: US 12,292,061 B2
(45) Date of Patent: May 6, 2025

(54) FLUID PRESSURE CIRCUIT

(71) Applicant: EAGLE INDUSTRY CO., LTD., Tokyo (JP)

(72) Inventor: Yoshiyuki Shimada, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/714,010

(22) PCT Filed: Nov. 30, 2022

(86) PCT No.: PCT/JP2022/044191
§ 371 (c)(1),
(2) Date: May 28, 2024

(87) PCT Pub. No.: WO2023/106179
PCT Pub. Date: Jun. 15, 2023

(65) Prior Publication Data
US 2025/0035132 A1 Jan. 30, 2025

(30) Foreign Application Priority Data
Dec. 9, 2021 (JP) ................................ 2021-200413

(51) Int. Cl.
*F15B 11/02* (2006.01)
*F15B 11/024* (2006.01)

(52) U.S. Cl.
CPC ..... *F15B 11/024* (2013.01); *F15B 2011/0243* (2013.01)

(58) Field of Classification Search
CPC ........... F15B 11/024; F15B 2011/0243; F15B 21/14; E02F 9/2217
See application file for complete search history.

(56) References Cited

U.S. PATENT DOCUMENTS 3,802,453 A 4/1974 Fleury
4,592,454 A 6/1986 Michel
4,688,380 A 8/1987 Reinhardt et al.
4,754,603 A 7/1988 Rosman
5,355,773 A 10/1994 Winkels
6,772,671 B2 8/2004 Asano et al.
6,951,103 B2 10/2005 Berthod et al.
(Continued)

FOREIGN PATENT DOCUMENTS

CN 101631974 A 1/2010
CN 103148064 A 6/2013
(Continued)

OTHER PUBLICATIONS

PCT International Search Report, Written Opinion and Internation Preliminary Report on Patentability issued in PCT/JP2023/005748, dated Mar. 20, 2023, 18 pages.
(Continued)

*Primary Examiner* — Abiy Teka
(74) *Attorney, Agent, or Firm* — HAYES SOLOWAY P.C.

(57) ABSTRACT

There is provided a fluid pressure circuit capable of preventing unintentional operation of a cylinder device. A return flow passage through which a return fluid flows from a cylinder device to a regenerative drive source is provided with a control valve that opens the flow passage in response to an operation of an operating device.

10 Claims, 16 Drawing Sheets

(56) References Cited

U.S. PATENT DOCUMENTS

| | | | |
|---|---|---|---|
| 7,337,610 B2 | 3/2008 | Bitter | |
| 8,468,818 B2 | 6/2013 | Hyodo | |
| 8,826,654 B2 | 9/2014 | Nelson et al. | |
| 8,839,617 B2 | 9/2014 | Nelson | |
| 9,228,323 B2 | 1/2016 | Kawasaki et al. | |
| 9,926,950 B2 | 3/2018 | Ooki et al. | |
| 10,400,802 B2 | 9/2019 | Sugano | |
| 2002/0125052 A1* | 9/2002 | Naruse .................. | B60K 6/543 903/918 |
| 2006/0223670 A1 | 10/2006 | Nishikawa et al. | |
| 2009/0084102 A1 | 4/2009 | Mueller | |
| 2009/0165451 A1 | 7/2009 | Mueller et al. | |
| 2011/0268588 A1 | 11/2011 | Kawasaki et al. | |
| 2011/0302914 A1 | 12/2011 | Helbling | |
| 2012/0304631 A1 | 12/2012 | Nelson | |
| 2013/0125536 A1 | 5/2013 | Ho et al. | |
| 2013/0133318 A1 | 5/2013 | Vogl et al. | |
| 2014/0208728 A1 | 7/2014 | Ma et al. | |
| 2014/0238007 A1 | 8/2014 | Payne | |
| 2015/0152900 A1 | 6/2015 | Egawa et al. | |
| 2015/0165887 A1 | 6/2015 | Krittian | |
| 2015/0377264 A1* | 12/2015 | Ooki .................... | E02F 9/2095 60/403 |
| 2016/0215481 A1 | 7/2016 | Kawasaki et al. | |
| 2016/0237648 A1 | 8/2016 | Kawasaki et al. | |
| 2017/0073932 A1 | 3/2017 | Hijikata et al. | |
| 2017/0314233 A1 | 11/2017 | Egawa et al. | |
| 2018/0087243 A1 | 3/2018 | Ito et al. | |
| 2020/0040920 A1 | 2/2020 | Shimada | |
| 2020/0123737 A1 | 4/2020 | Kang | |

FOREIGN PATENT DOCUMENTS

| | | | |
|---|---|---|---|
| DE | 102005060994 | A1 | 6/2007 |
| DE | 102010006464 | A1 | 8/2011 |
| JP | 4714857 | | 5/1972 |
| JP | 596403 | A | 1/1984 |
| JP | H116557 | A | 1/1999 |
| JP | 200289511 | A | 3/2002 |
| JP | 2005308126 | A | 11/2005 |
| JP | 200889024 | A | 4/2008 |
| JP | 200895788 | A | 4/2008 |
| JP | 2010537130 | A | 12/2010 |
| JP | 2012097844 | A | 5/2012 |
| JP | 2014029180 | A | 2/2014 |
| JP | 2014181804 | A | 9/2014 |
| JP | 201614398 | A | 1/2016 |
| JP | 201715130 | A | 1/2017 |
| WO | WO2008088044 | A1 | 5/2010 |
| WO | WO2015114736 | A1 | 8/2015 |
| WO | WO2016084421 | A1 | 6/2016 |
| WO | WO2018147261 | A1 | 8/2018 |

OTHER PUBLICATIONS

PCT International Search Report, Written Opinion and Internation Preliminary Report on Patentability issued in PCT/JP2023/005749, dated Mar. 20, 2023, 15 pages.

PCT International Search Report, Written Opinion and Internation Preliminary Report on Patentability issued in PCT/JP2023/044191, dated Jan. 31, 2023, 24 pages.

* cited by examiner

FLUID PRESSURE CIRCUIT

TECHNICAL FIELD

The present invention relates to a fluid pressure circuit, for example, a fluid pressure circuit that controls the rod stroke of a cylinder device in response to an operation command.

BACKGROUND ART

A fluid pressure circuit that controls the rod stroke of a cylinder device in response to an operation command is used in automobiles, construction machines, cargo transport vehicles, industrial machines, and the like. For example, a hydraulic excavator supplies a pressure fluid from a hydraulic pump to a cylinder device connected to a hydraulic circuit as the fluid pressure circuit, to extend and retract a cylinder device to drive a load. In such a fluid pressure circuit, energy saving is required, and some of the fluid discharged from the cylinder device is regenerated by a regenerative motor to effectively utilize energy.

As an example of such a fluid pressure circuit, there is one disclosed in Patent Citation 1. The fluid pressure circuit of Patent Citation 1 mainly includes a pump; a cylinder device; a regenerative motor; a switching valve connected between a pump and the cylinder device; a remote control valve including an operation lever; a pilot pump that supplies a pilot fluid to the switching valve in response to the operation of the operation lever of the remote control valve; and a flow diversion valve capable of diverting the fluid, which is discharged from the cylinder device, to the regenerative motor. In the switching valve, the position of a spool can be changed to an extension position, a neutral position, or a retraction position by the pilot fluid controlled in response to the operation of the operation lever of the remote control valve. When the operation lever of the remote control valve is operated in a retraction direction, in the flow diversion valve, the position of the spool is changed from the neutral position to a flow diversion position in response to an electric signal transmitted from a controller.

When the switching valve is switched to the extension position by operating the operation lever of the remote control valve, hydraulic oil from a hydraulic pump is introduced into a bottom chamber of the cylinder device, and a rod is extends from a cylinder. On the other hand, when the switching valve is switched to the retraction position by operating the operation lever of the remote control valve, the hydraulic oil from the hydraulic pump is introduced into a rod chamber of the cylinder device, and the rod retracts into the cylinder. In addition, during retraction of the rod, the spool of the flow diversion valve switches from the neutral position to the flow diversion position in response to an electric signal from the controller, and some of return oil discharged from the bottom chamber is supplied to the regenerative motor, so that a generator is driven to obtain electric energy.

CITATION LIST

Patent Literature

Patent Citation 1: WO 2018/147261 A (Page 7, FIG. 2)

SUMMARY OF INVENTION

Technical Problem

However, in the fluid pressure circuit as in Patent Citation 1, when the cylinder device is in an extended state and the operation lever of the remote control valve is in the neutral position, for example, due to the output of an erroneous electric signal caused by a malfunction of an arithmetic circuit incorporated into the controller, the spool of the flow diversion valve switches to the flow diversion position, the oil from the bottom chamber is discharged to the regenerative motor, so that the cylinder device operates unintentionally in the retraction direction, which is a risk.

The present invention has been made in view of such a problem, and an object of the present invention is to provide a fluid pressure circuit capable of preventing unintentional operation of a cylinder device.

Solution to Problem

In order to solve the foregoing problem, according to the present invention, there is provided a fluid pressure circuit including: a tank that stores a fluid; a fluid supply source that supplies the fluid in the tank; a cylinder device extended and retracted by the fluid from the fluid supply source; a switching valve disposed between the fluid supply source and the cylinder device to switch between flow passages of the fluid; a flow diversion valve located closer to a side of the cylinder device than the switching valve and configured to divert at least some of a return fluid returning from the cylinder device to the tank; a regenerative drive source driven in a regenerative mode by the diverted return fluid; an operating device configured to output a switching command corresponding to an operation to the switching valve; and an actuating device configured to output a switching command to the flow diversion valve in response to operation of the operating device, wherein a return flow passage through which the return fluid flows from the cylinder device to the regenerative drive source is provided with a control valve that opens the flow passage in response to the operation of the operating device. According to the aforesaid feature of the present invention, when the cylinder device is in an extended state and an operation lever of the operating device is in a neutral position, even in a case where the flow diversion valve switches to a flow diversion state due to a malfunction, the return flow passage is closed by the control valve, so that unintentional operation of the cylinder device can be suppressed. In addition, when a predetermined operation is performed on the operating device, the flow diversion valve switches to a flow diversion state, and the control valve switches to open the return flow passage, so that the regenerative drive source can be driven in a regenerative mode.

It may be preferable that the actuating device detects the operation of the operating device as an electric signal, and outputs the switching command to the flow diversion valve. According to this preferable configuration, the flow diversion valve can be controlled by detecting the predetermined operation of the operating device. In addition, since the electric signal is used, it is easy to control the flow diversion valve by adding other conditions to the predetermined operation of the operating device.

It may be preferable that the control valve is a pilot valve that is switched by a pilot pressure, and the flow diversion valve is an electromagnetic valve that is switched by electricity. According to this preferable configuration, the control valve and the flow diversion valve can be controlled in different modes.

It may be preferable that the switching valve is a pilot valve, and the switching valve and the control valve are switched by the pilot pressure. According to this preferable configuration, since the switching valve and the control valve are switched by the same pilot pressure, there is no need to separately prepare a flow passage for a pilot fluid, so that the structure can be simplified, and the switching valve and the control valve can be switched at substantially the same timing.

It may be preferable that the control valve is provided in a flow passage between the cylinder device and the flow diversion valve. According to this preferable configuration, since the control valve is provided closer to the cylinder device side than the flow diversion valve, even in a case where the flow diversion valve switches to a flow diversion state, the return fluid is not discharged into the tank via the switching valve.

It may be preferable that a housing of the flow diversion valve and a housing of the control valve are separate bodies, and are configured such that the flow passages are connected by stacking and fixing the housings. According to this preferable configuration, the degree of freedom in installing the flow diversion valve or the control valve is high.

DESCRIPTION OF EMBODIMENTS

Modes for implementing a fluid pressure circuit according to the present invention will be described below based on embodiments.

First Embodiment

A fluid pressure circuit according to a first embodiment of the present invention will be described with reference to FIGS. 1 to 10.

Figure 1:
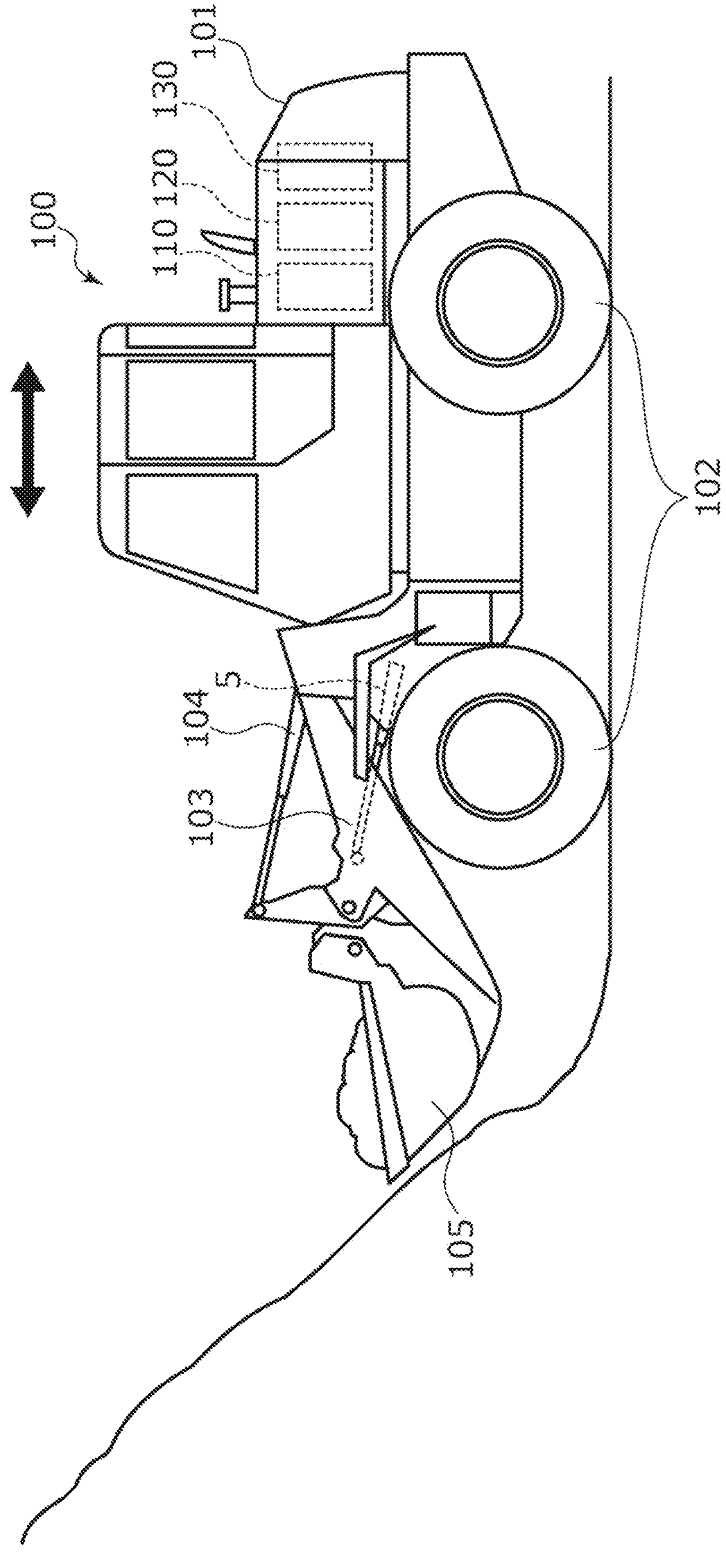
FIG. 1 is a view illustrating a wheel loader into which a hydraulic circuit as a fluid pressure circuit according to a first embodiment of the present invention is incorporated.

A hydraulic circuit as the fluid pressure circuit according to the first embodiment is a hydraulic circuit that controls the stroke of a cylinder device in work machines, construction machines, cargo transport vehicles, automobiles, and the like in response to an operation command, and is incorporated into, for example, the powertrain of a wheel loader 100 illustrated in FIG. 1. The wheel loader 100 mainly includes a vehicle body 101, wheels 102 for traveling, a work arm 103, a hydraulic cylinder 104, and a bucket 105 for loading gravel or the like. The vehicle body 101 is provided with a machine 110 such as an engine; a fluid circuit 120 for traveling; the hydraulic cylinder 104; and a hydraulic circuit 130 for work that drives a hydraulic cylinder 5 or the like as the cylinder device.

Figure 2:
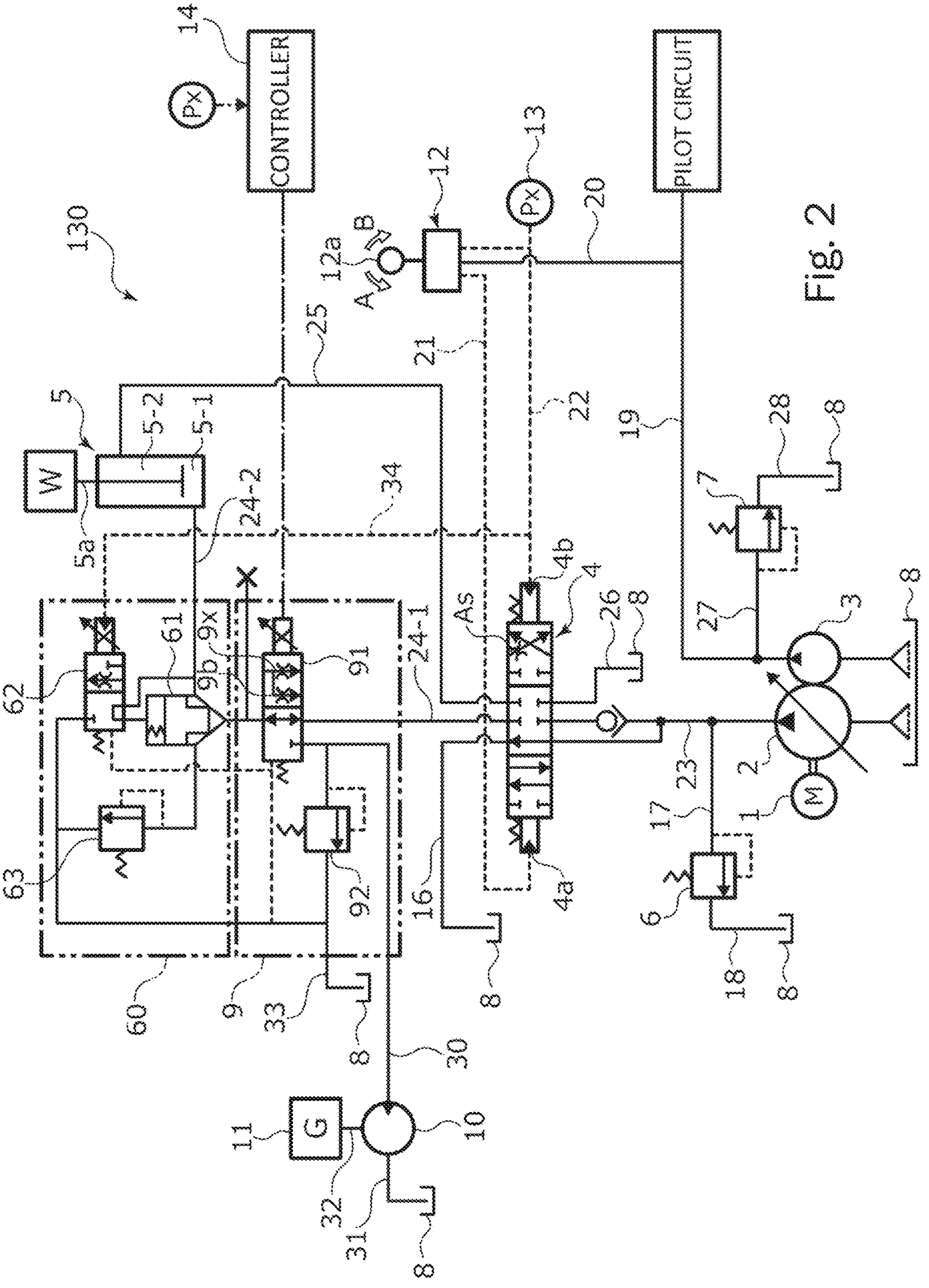
FIG. 2 is a diagram illustrating the hydraulic circuit in the first embodiment.

As illustrated in FIG. 2, the hydraulic circuit 130 includes a main hydraulic pump 2 as a fluid supply source driven by a drive mechanism 1 such as an engine or a motor; a pilot hydraulic pump 3; a switching valve 4; the hydraulic cylinder 5; a relief valve 6; a relief valve 7; a tank 8; a flow diversion valve device 9; a control valve device 60; a regenerative motor 10 as a regenerative drive source; a generator 11; a remote control valve 12 as an operating device; a pressure sensor 13 and a controller 14 as an actuating device; and oil passages 16 to 33. Incidentally, the regenerative motor is provided as an example of the regenerative drive source; however, the regenerative drive source is not limited thereto.

The main hydraulic pump 2 is coupled to the drive mechanism 1 such as an internal combustion engine, and is rotated by power from the drive mechanism 1, to supply hydraulic oil to a downstream side through the oil passage 23.

The hydraulic oil discharged from the main hydraulic pump 2 flows into the switching valve 4 through the oil passage 23. The switching valve 4 is a 6-port 3-position open center type switching valve, and in a state where a spool is in a neutral position, the entire amount of hydraulic oil discharged from the main hydraulic pump 2 flows to the tank 8 through the oil passage 16.

In addition, in a main circuit including the main hydraulic pump 2, the relief valve 6 is installed to prevent oil devices in the circuit from being damaged due to abnormal high pressure occurring when a rod 5*a* of the hydraulic cylinder 5 has reached an extension termination or a retraction termination or when a sudden load is applied to the hydraulic cylinder 5 and the oil in the circuit is blocked, and the high hydraulic oil is discharged into the tank 8 through the oil passages 17 and 18.

Next, similarly to the main hydraulic pump 2, the pilot hydraulic pump 3 is coupled to the drive mechanism 1 and is operated by power from the drive mechanism 1, to supply the hydraulic oil to a downstream side through the oil passage 19. Here, some of the hydraulic oil supplied to the downstream side through the oil passage 19 is supplied to the remote control valve 12 through the oil passage 20.

Figure 5:
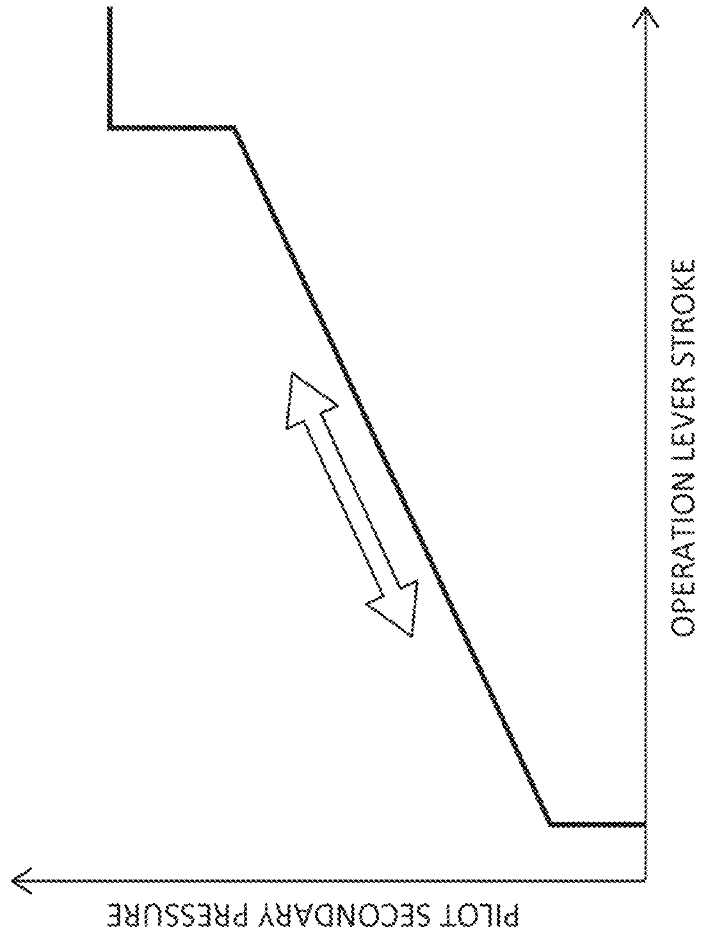
FIG. 5 is a graph illustrating the relationship between operation lever stroke and pilot secondary pressure in the first embodiment.

The remote control valve 12 is a variable pressure reduction valve, and controls the extension position (extension amount) or retraction position (retraction amount) of the rod 5*a* by operating the rod 5*a* of the hydraulic cylinder 5 in an extension direction A or a retraction direction B using the operation lever 12*a*, and thus, by supplying pilot secondary pressure, which is proportional to the operation lever stroke of an operation lever 12*a* as illustrated in FIG. 5, to a signal port 4*a* or a signal port 4*b* of the switching valve 4 through the pilot signal oil passage 21 or the pilot signal oil passage 22. Incidentally, the operation amount of the operation lever 12*a* is substantially equivalent to the stroke of the operation lever 12*a*, and is referred to as an operation lever stroke. In addition, in the present invention, an operation in the retraction direction B is referred to as a predetermined operation.

When the operation lever 12*a* of the remote control valve 12 is operated in the extension direction A so that the switching valve 4 is switched to the extension position, the hydraulic oil from the main hydraulic pump 2 flows into a bottom chamber 5-1 of the hydraulic cylinder 5 through the oil passage 23, the oil passage 24-1, the flow diversion valve device 9, the control valve device 60, and the oil passage 24-2, and the oil in a rod chamber 5-2 passes through the oil passage 25, and further, is discharged into the tank 8 through the oil passage 26 via switching valve 4. Accordingly, the rod 5*a* of the hydraulic cylinder 5 actuates in the extension direction.

On the other hand, when the operation lever 12*a* of the remote control valve 12 is operated in the retraction direction B so that the switching valve 4 is switched to the retraction position, the hydraulic oil from the main hydraulic pump 2 flows into the rod chamber 5-2 of the hydraulic cylinder 5 through the oil passage 23 and the oil passage 25, and the oil in the bottom chamber 5-1 passes through the oil passage 24-2, the control valve device 60, the flow diversion valve device 9, and the oil passage 24-1, and further, is discharged into the tank 8 through the oil passage 26 via the switching valve 4. Accordingly, the rod 5*a* of the hydraulic cylinder 5 actuates in the retraction direction.

Figure 6:
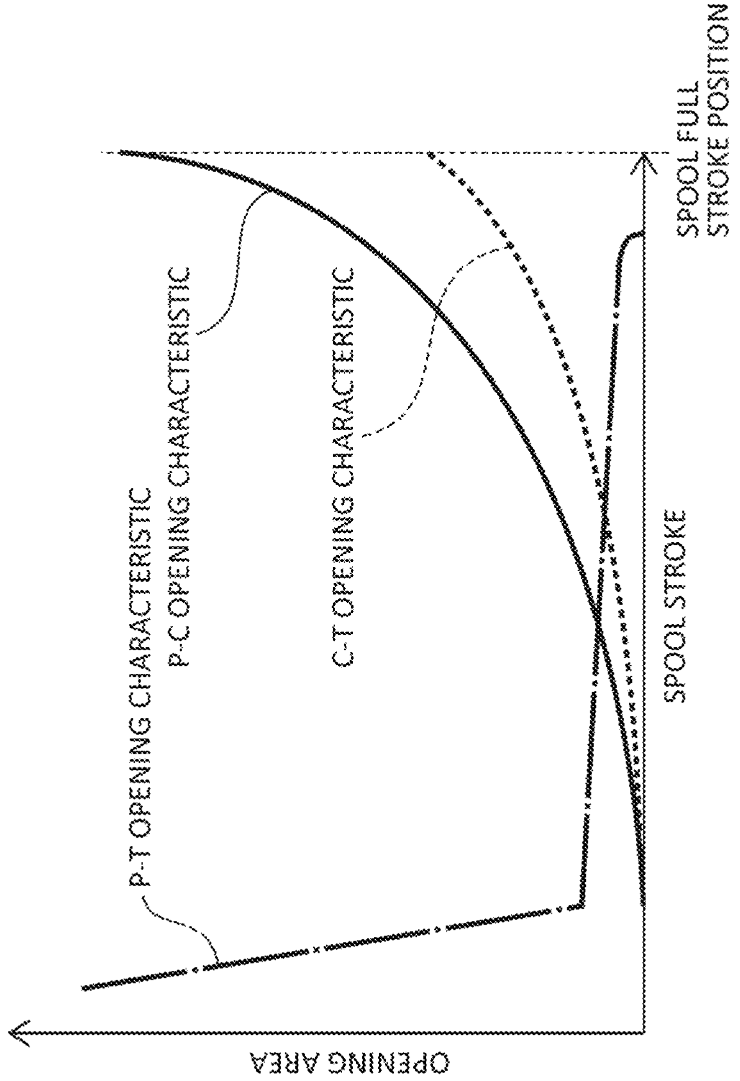
FIG. 6 is a graph illustrating the relationship between spool stroke and opening area during retraction in the first embodiment.
Figure 7:
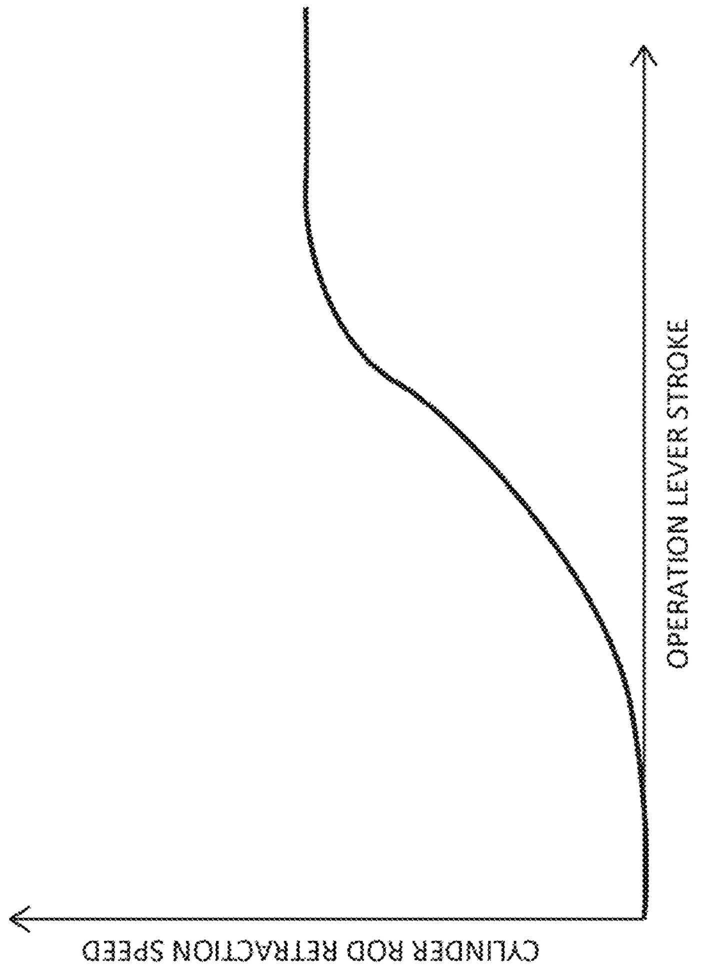
FIG. 7 is a graph illustrating the relationship between the operation lever stroke and rod retraction speed in the first embodiment.

As illustrated in FIG. 5, the remote control valve 12 outputs the pilot secondary pressure that proportionally increases with an increase in the operation lever stroke of the operation lever 12*a* of the remote control valve 12. The switching valve 4 is configured such that the spool strokes substantially in proportion to the pilot secondary pressure of the remote control valve 12, and as illustrated in FIG. 6, since the switching valve 4 has opening characteristics in which the opening amount of the spool increases according to the spool stroke, the supply oil amount of the hydraulic oil to the hydraulic cylinder 5 increases with an increase in the opening amount, and as illustrated in FIG. 7, the actuation speed of the rod 5*a* of the hydraulic cylinder 5 increases. Namely, the speed of the rod can be controlled according to the operation lever stroke of the operation lever 12*a* of the remote control valve 12.

Incidentally, when a load W acts on the hydraulic cylinder 5 in the direction of gravity as illustrated in FIG. 2, the speed of the rod is predominantly controlled by C-T opening (cylinder→tank) of FIG. 6. A variable throttle As (also referred to as a first throttle) is provided in a flow passage connecting the oil passage 24-1 of the switching valve 4 and the oil passage 26, and the flow rate is restricted by the variable throttle As, so that the actuation speed of the rod 5*a* due to the load W can be slowed down.

In addition, in a pilot circuit including the pilot hydraulic pump 3, the relief valve 7 is installed to control the maximum pressure in the circuit, and when the lever of the remote control valve 12 is in a neutral position, the hydraulic oil is discharged into the tank 8 through the oil passage 27 and the oil passage 28.

The control valve device 60 and the flow diversion valve device 9 are provided between the oil passage 24-1 and the oil passage 24-2 connecting the bottom chamber 5-1 of the hydraulic cylinder 5 and the switching valve 4. The flow diversion valve device 9 is disposed on an oil passage 24-1 side of a switching valve 4 side, and the control valve device 60 is disposed on an oil passage 24-2 side of a hydraulic cylinder 5 side.

Figure 3:
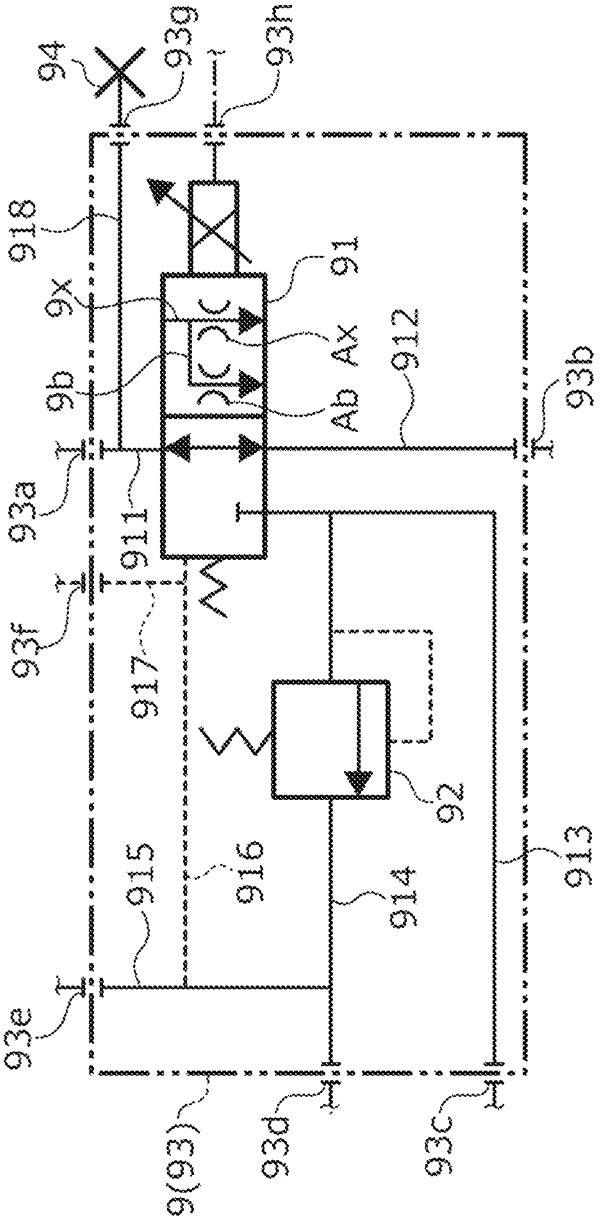
FIG. 3 is a main part enlarged diagram illustrating a flow diversion valve device in the first embodiment.

As illustrated in FIGS. 2 and 3, the flow diversion valve device 9 mainly includes a flow diversion valve 91 that is a 3-port 2-position normal open type electromagnetic proportional throttle valve; a relief valve 92 that controls the maximum pressure in the circuit of the flow diversion valve device 9; a housing 93 accommodating these valves; flow passages 911 to 918 provided in the housing 93; and ports 93*a* to 93*g* and an opening 93*h* provided in the housing 93.

Specifically, referring to FIGS. 2, 3, 4, and 10, the flow passage 911 connects the flow diversion valve 91 and the port 93*a* communicating with a flow passage 617 of the control valve device 60 to be described later. The flow passage 912 connects the port 93*b* and the flow diversion valve 91. The flow passage 913 connects the port 93*c* and the flow diversion valve 91. The flow passage 914 connects the port 93*d* and the flow passage 913. The flow passage 915 connects the port 93*e* and the flow passage 914. The flow passage 916 connects the flow diversion valve 91 and the flow passage 915. The flow passage 917 connects the port 93*f* and the flow passage 916. The flow passage 918 connects the port 93*g* and the flow passage 911. In the present embodiment, the port 93*g* is closed with a closing member 94.

In addition, the port 93*a* communicates with a port 64*a* of the control valve device 60. The port 93*b* communicates with the oil passage 24-1. The port 93*c* communicates with the oil passage 30 extending from the regenerative motor 10. The port 93*d* communicates with the oil passage 33 communicating with the tank 8. The port 93*e* communicates with a port 64*b* of the control valve device 60. The port 93*f* communicates with a port 64*e* of the control valve device 60. An electric signal line connecting the controller 14 and the flow diversion valve 91 is inserted into the opening 93*h* of a through-hole.

The flow diversion valve 91 is a pressure-compensated electromagnetic proportional control type flow rate adjustment valve capable of variably diverting a flow rate (hereinafter, may also be referred to as the priority flow rate) to a flow passage 9*b* side to be described later in response to an electric signal from the controller 14.

When the flow diversion valve 91 is in a neutral position (namely, a position during non-regeneration), the entire amount of oil in the bottom chamber 5-1 of the hydraulic cylinder 5 passes through the oil passage 24-2, the control valve device 60, the flow passage 911, the flow diversion valve 91, the flow passage 912, and the oil passage 24-1, and further, is discharged into the tank 8 through the oil passage 26 via the switching valve 4.

The flow diversion valve 91 includes a flow passage 9*x* connected to the oil passage 24-1 as the function of a switching position (namely, a position during regeneration), and a flow passage 9*b* branching from the oil passage 24-2 and connected to the oil passage 30. A variable throttle Ab (also referred to as a second throttle) is provided in the flow passage 9*b* connected to the oil passage 30, and a variable throttle Ax (also referred to as a third throttle) is provided in the flow passage 9*x* connected to the oil passage 24-1.

When the flow diversion valve 91 switches from the neutral position to a position where the oil passage branches into the oil passage 24-1 and the oil passage 30, some of the return oil is restricted in flow rate by the variable throttle Ab provided in the flow passage 9*b* connected to the oil passage 30, and flows into the oil passage 30, and the remaining return oil is restricted in flow rate by the variable throttle Ax provided in the flow passage 9*x* connected to the oil passage 24-1, is further restricted in flow rate by the variable throttle As of the switching valve 4 on the downstream side, and is discharged into the tank 8.

In addition, the pressure sensor 13 is installed on the pilot signal oil passage 22, and when the operation lever 12*a* of the remote control valve 12 is operated in the retraction direction B so that the pilot secondary pressure is generated in the pilot signal oil passage 22, an electric signal from the pressure sensor 13 is input to the controller 14. When the electric signal is input to the controller 14 and the situation is such that electricity needs to be stored in an electricity storage device (not illustrated), an electric signal is output to the flow diversion valve 91 from an arithmetic circuit pre-incorporated into the controller 14, and the flow diversion valve 91 switches to the position where the oil passage branches into the oil passage 24-1 and the oil passage 30. When the electricity storage device has not reached an allowable electricity storage amount, the controller 14 controls the flow diversion valve 91 to be switched at the same time when the switching valve 4 is switched. The switching of the flow diversion valve 91 causes some of the return oil to flow into the regenerative motor 10 through the oil passage 30 via the flow diversion valve 91, so that the regenerative motor 10 rotates and electricity is generated by the generator 11. The return oil that has passed through the regenerative motor 10 is discharged into the tank 8 via the oil passage 31.

Figure 8:
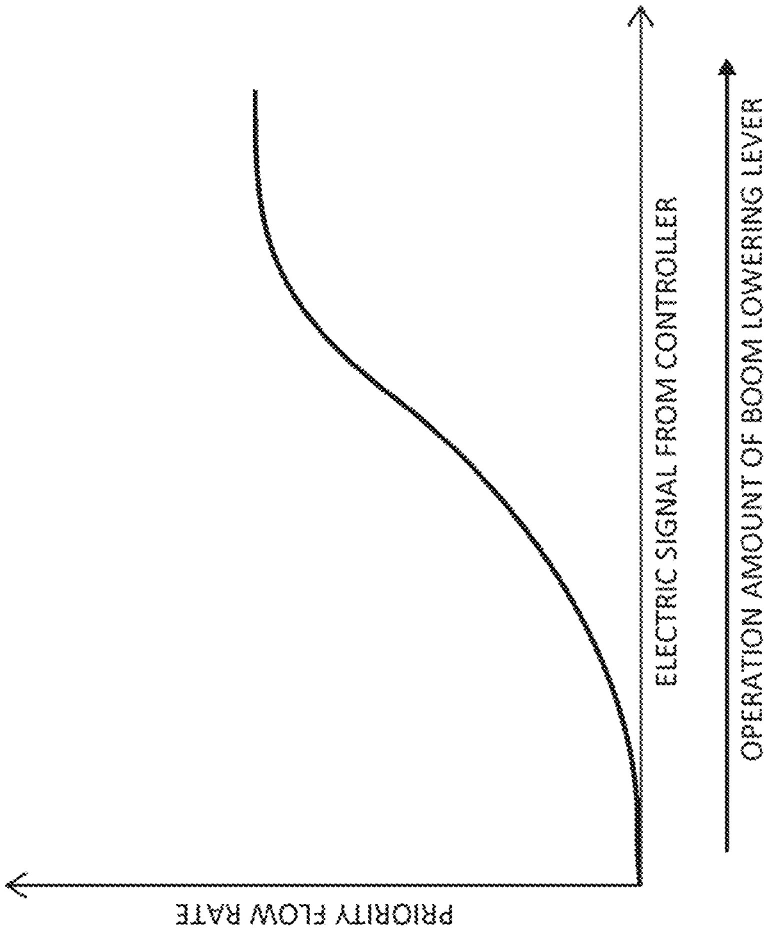
FIG. 8 is a graph illustrating the relationship between electric signal from a controller and priority flow rate in the first embodiment.

Incidentally, the flow diversion valve 91 has a flow rate control characteristic as illustrated in FIG. 8, and when an electric signal is not input from the controller 14, the priority flow rate to the flow passage 9*b* side is zero, and the priority flow rate can be increased or decreased in proportion to an electric signal from the controller 14.

In addition, the relief valve 92 is installed in the flow passage 914 to prevent oil devices in the flow diversion valve device 9 from being damaged due to abnormal high pressure occurring when the oil in the flow passage through which the priority flow rate of the flow diversion valve device 9 flows is blocked, and the high hydraulic oil is discharged into the tank 8 through the flow passage 914 and the oil passage 33.

Figure 9:
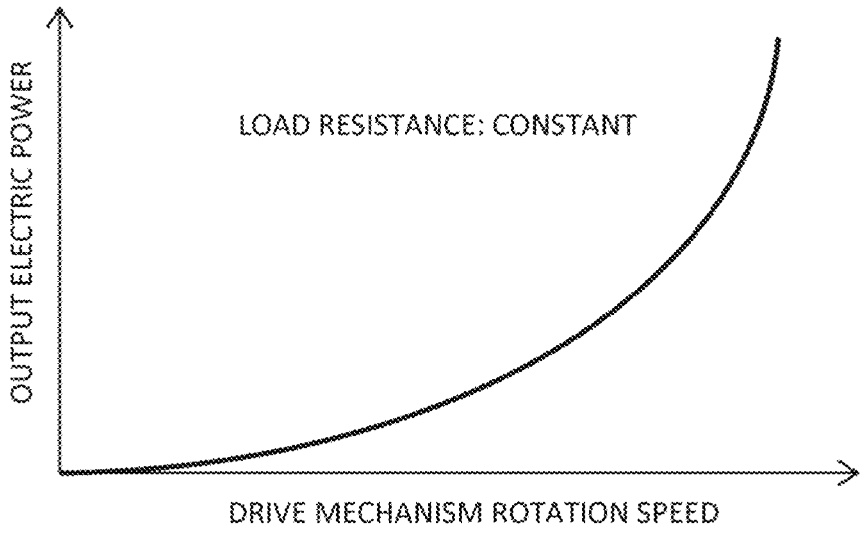
FIG. 9 is a graph illustrating the relationship between drive mechanism rotation speed and output electric power in the first embodiment.

The generator 11 is coupled to the regenerative motor 10 by a coupling portion 32, and outputs electric power with an output characteristic as illustrated in FIG. 9 according to the rotation speed of a drive mechanism such as the regenerative motor 10. In addition, when the amount of electricity generated by the generator 11 has reached the allowable electricity storage amount of the electricity storage device, the electric signal from the controller 14 to the flow diversion valve 91 is cut off, and the flow diversion valve 91 returns to the neutral position, so that the flow of the oil into the regenerative motor 10 is cut off and the generator 11 is stopped not to generate electricity.

Figure 4:
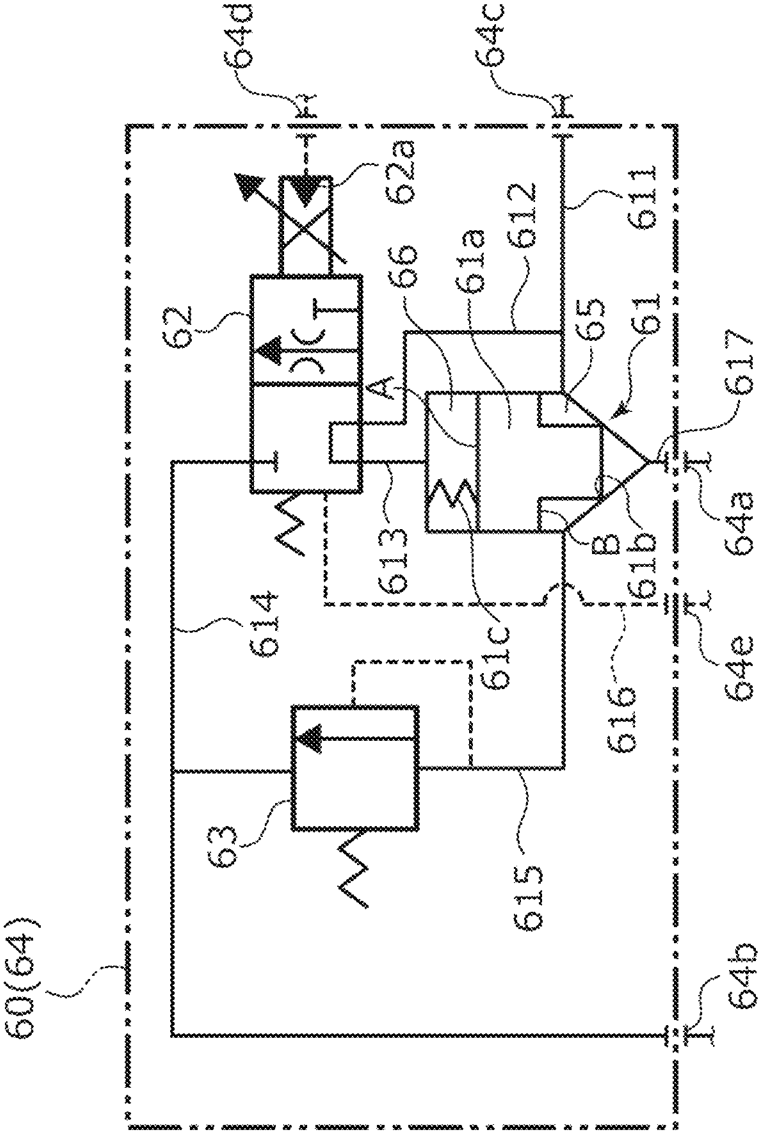
FIG. 4 is a main part enlarged diagram illustrating a control valve device in the first embodiment.

As illustrated in FIGS. 2 and 4, the control valve device 60 mainly includes a control valve 61; a control switching valve 62; a relief valve 63; a housing 64 accommodating these valves (refer to FIG. 10); flow passages 611 to 617 provided in the housing 64; and ports 64*a* to 64*e* provided in the housing 64.

Specifically, the flow passage 611 connects the control valve 61 and the port 64*c* communicating with the oil passage 24-2. The flow passage 612 connects the flow passage 611 and the control switching valve 62. The flow passage 613 connects the flow passage 612 and the control switching valve 62. The flow passage 614 connects the control switching valve 62 and the port 64*b* communicating with the flow passage 915 of the flow diversion valve device 9. The flow passage 615 connects the control valve 61 and the flow passage 614. The flow passage 616 connects the control switching valve 62 and the port 64*e* communicating with the flow passage 917 of the flow diversion valve device 9. The flow passage 617 connects the control valve 61 and the port 64*a* communicating with the flow passage 911 of the flow diversion valve device 9.

The control valve 61 includes a valve body 61*a* that slides inside a valve chamber that is an empty space in the housing 64, and a spring 61*c* that presses the valve body 61*a* against a seat 61*b*. The valve body 61*a* includes a large-diameter portion and a small-diameter portion, and a tip outer edge of the small-diameter portion comes into contact with the seat 61*b*.

When the control valve 61 is closed, an annular space formed between the large-diameter portion and the small-diameter portion of the valve body 61*a* and the valve chamber of the housing 64 is a first oil chamber 65, and the spring 61*c* side with respect to the valve body 61*a* is a second oil chamber 66. The flow passage 611 and the flow passage 615 communicate with the first oil chamber 65 of the control valve 61.

The control switching valve 62 is a 3-port 2-position type switching valve that is switched in position by pilot pressure flowing thereinto from an oil passage 34 branching from the pilot signal oil passage 22.

The relief valve 63 is installed in the flow passage 615, and for example, when abnormal high pressure occurs in the first oil chamber 65 during sudden stop of the hydraulic cylinder 5, the oil can be discharged into the tank 8 through the flow passage 614, the flow passage 915, the flow passage 914, and the oil passage 33.

Here, when an area of the large-diameter portion of the valve body 61*a*, namely, an area on a second oil chamber 66 side is defined as A and an annular area obtained by excluding the small-diameter portion from the large-diameter portion on the opposite side, namely, an area on a first oil chamber 65 side is defined as B, the area A is larger than the area B.

$$A > B \qquad \text{Equation (1)}$$

In a state where the pilot pressure is not input to a signal port 62*a* of the control switching valve 62 from the oil passage 34, namely, when the control switching valve 62 is in a neutral position, the flow passage 612 branching from the flow passage 611 communicates with the second oil chamber 66 of the control valve 61 via the flow passage 613. According to this configuration, when the pressure in the first oil chamber 65 is Pc and the biasing force of the spring 61*c* is Fs, a force (A·Pc+Fs) acting in a direction in which the valve body 61*a* is pressed against a seat 61*b* side is larger than a force (B·Pc) acting in a direction in which the valve body 61*a* is separated from the seat 61*b*.

$$A \cdot Pc + Fs > B \cdot Pc \quad \text{Equation (2)}$$

Therefore, the valve body 61*a* is pressed against the seat 61*b*, communication between the flow passage 611 and the flow passage 617 is shut off, and the oil does not flow from the flow passage 611 to the flow passage 617.

On the other hand, in a state where the pilot pressure is input to the signal port 62*a* of the control switching valve 62 from the oil passage 34, namely, when the control switching valve 62 is in a switching position, communication between the flow passage 612 and the flow passage 613 is shut off, and the flow passage 613 and the flow passage 614 communicate with each other.

In addition, since the flow passage 614 communicates with the tank 8 via the flow passage 915 and the flow passage 914 of the flow diversion valve device 9 and the oil passage 33, the pressure in the second oil chamber 66 becomes tank pressure. Since the tank pressure is substantially zero and has almost no influence on the valve body 61*a*, the force acting in the direction in which the valve body 61*a* is pressed against the seat 61*b* side becomes Fs, and the force (Fs) is smaller than the force (B. Pc) acting in the direction in which the valve body 61*a* is separated from the seat 61*b*.

$$Fs < B \cdot Pc \quad \text{Equation (3)}$$

Accordingly, the valve body 61*a* is separated from the seat 61*b*, the first oil chamber 65 and the flow passage 617 communicate with each other, and the oil flows from the first oil chamber 65 to the flow passage 617.

Next, the state of the hydraulic circuit 130 when the rod 5*a* of the hydraulic cylinder 5 actuates in the extension direction will be described with reference to FIGS. 2 to 4.

When the rod 5*a* of the hydraulic cylinder 5 actuates in the extension direction, the switching valve 4 assumes the extension position, the flow diversion valve 91 of the flow diversion valve device 9 assumes the neutral position, and the control switching valve 62 of the control valve device 60 assumes the neutral position.

For that reason, the hydraulic oil from the main hydraulic pump 2 reaches the control valve 61 through the flow passage 912 of the flow diversion valve device 9, the flow diversion valve 91, the flow passage 911, and the flow passage 617 of the control valve device 60, pushes up the valve body 61*a* against the spring 61*c*, and flows into the bottom chamber 5-1 through the flow passage 611 and the oil passage 24-2. Then, the oil in the rod chamber 5-2 passes through the oil passage 25, and further, is discharged into the tank 8 through the oil passage 26 via the switching valve 4. Accordingly, the rod 5*a* of the hydraulic cylinder 5 actuates in the extension direction.

Next, the state of the hydraulic circuit 130 when the rod 5*a* of the hydraulic cylinder 5 actuates in the retraction direction and electricity generation is performed will be described with reference to FIGS. 2 to 4.

When the rod 5*a* of the hydraulic cylinder 5 actuates in the retraction direction and electricity generation is performed, the switching valve 4 assumes the retraction position, the flow diversion valve 91 of the flow diversion valve device 9 assumes the switching position, and the control switching valve 62 of the control valve device 60 assumes the switching position.

For that reason, the hydraulic oil from the main hydraulic pump 2 flows into the rod chamber 5-2 of the hydraulic cylinder 5 through the oil passage 25. Further, the return oil in the bottom chamber 5-1 passes through the oil passage 24-2, the flow passage 611 of the control valve device 60, the first oil chamber 65, the flow passage 617, and the flow passage 911 of the flow diversion valve device 9, some of the return oil is discharged into the tank 8 via the flow passage 9*b*, the flow passage 913, the oil passage 30, the regenerative motor 10, and the oil passage 31, and the remaining return oil is discharged into the tank 8 via the flow passage 9*x*, the flow passage 912, the oil passage 24-1, and the oil passage 26. Accordingly, the rod 5*a* of the hydraulic cylinder 5 actuates in the retraction direction, and electricity generation is performed by the generator 11.

Next, the state of the hydraulic circuit 130 when the rod 5*a* of the hydraulic cylinder 5 actuates in the retraction direction and electricity generation is not performed will be described with reference to FIGS. 2 to 4.

When the rod 5*a* of the hydraulic cylinder 5 actuates in the retraction direction and electricity generation is not performed, the switching valve 4 assumes the retraction position, the flow diversion valve 91 of the flow diversion valve device 9 assumes the neutral position, and the control switching valve 62 of the control valve device 60 assumes the switching position.

For that reason, the hydraulic oil from the main hydraulic pump 2 flows into the rod chamber 5-2 of the hydraulic cylinder 5 through the oil passage 25. Further, the return oil in the bottom chamber 5-1 is discharged into the tank 8 via the oil passage 24-2, the flow passage 611 of the control valve device 60, the first oil chamber 65, the flow passage 617, the flow passages 911 and 912 of the flow diversion valve device 9, the oil passage 24-1, and the oil passage 26. Accordingly, the rod 5*a* of the hydraulic cylinder 5 actuates in the retraction direction, and electricity generation is not performed by the generator 11.

In the hydraulic circuit 130, when the rod 5*a* of the hydraulic cylinder 5 is in an extended state and the operation lever 12*a* of the remote control valve 12 is in the neutral position, for example, due to the output of an erroneous electric signal caused by a malfunction of the arithmetic circuit incorporated into the controller 14, the flow diversion valve 91 switches from the neutral position to a flow diversion position, the oil from the bottom chamber 5-1 is discharged to a regenerative motor 10 side, so that the hydraulic cylinder 5 operates unintentionally in the retraction direction, which is a risk.

In the hydraulic circuit 130 of the present embodiment, when the hydraulic cylinder 5 is in an extended state and the operation lever 12*a* of the remote control valve 12 is in the neutral position, even in a case where the flow diversion valve 91 switches to a flow diversion state due to a malfunction, the return oil in the bottom chamber 5-1 is supplied into the second oil chamber 66 of the control valve 61, and the oil passage 24-2 as a return flow passage between the hydraulic cylinder 5 and the flow diversion valve device 9 is closed by the control valve 61, so that unintentional retraction operation of the hydraulic cylinder 5 can be suppressed. In addition, when the operation lever 12*a* of the remote control valve 12 is operated in the retraction direction B, the flow diversion valve 91 switches to a flow diversion state, and the control valve 61 switches to open the oil passage 24-2, so that the regenerative motor 10 can be driven in a regenerative mode.

In addition, the pressure sensor 13 and the controller 14 detect the operation of the operation lever 12a of the remote control valve 12 in the retraction direction B as an electric signal, and output a switching command to the flow diversion valve 91. According to this configuration, the flow diversion valve 91 can be controlled by detecting the operation of the operation lever 12a of the remote control valve 12 in the retraction direction. Since the electric signal is used in such a manner, it is easy to control the flow diversion valve 91 by adding other conditions to the operation of the operation lever 12a of the remote control valve 12 in the retraction direction B. For example, in addition to the operation of the operation lever 12a of the remote control valve 12 in the retraction direction B, it is easy to perform control such as switching the flow diversion valve 91 according to the electricity storage amount of the electricity storage device.

In addition, the control valve 61 is a pilot valve that is switched by the pilot pressure. Specifically, the control switching valve 62 is switched to the switching position by the pilot pressure, so that the control valve 61 opens the flow passage. In addition, the flow diversion valve 91 is an electromagnetic valve that is switched by electricity. According to this configuration, opening and closing control of the control valve 61 and diversion control of the flow diversion valve 91 can be controlled in different modes. For example, the opening degree of the control valve 61 and the opening degree of the flow diversion valve 91 can be separately adjusted.

In addition, since the switching valve 4 is a pilot valve that is switched by the pilot pressure, and the control valve 61 is switched at the same pilot pressure as the switching valve 4, there is no need to separately prepare flow passages for a pilot fluid, so that the structure can be simplified. In addition, since the switching valve 4 and the control valve 61 switch at substantially the same timing, the oil passage 24-2 can be reliably opened and closed in response to the operation of the operation lever 12a of the remote control valve 12.

In addition, the control valve 61 is provided in the oil passage 24-2 between the hydraulic cylinder 5 and the flow diversion valve 91. According to this configuration, since the control valve 61 is provided closer to the hydraulic cylinder 5 side than the flow diversion valve 91, even in a case where the flow diversion valve 91 switches to a flow diversion state when the hydraulic cylinder 5 is in an extended state and the operation lever 12a of the remote control valve 12 is in the neutral position, the return oil is not discharged into the tank 8 via the switching valve 4.

Figure 10:
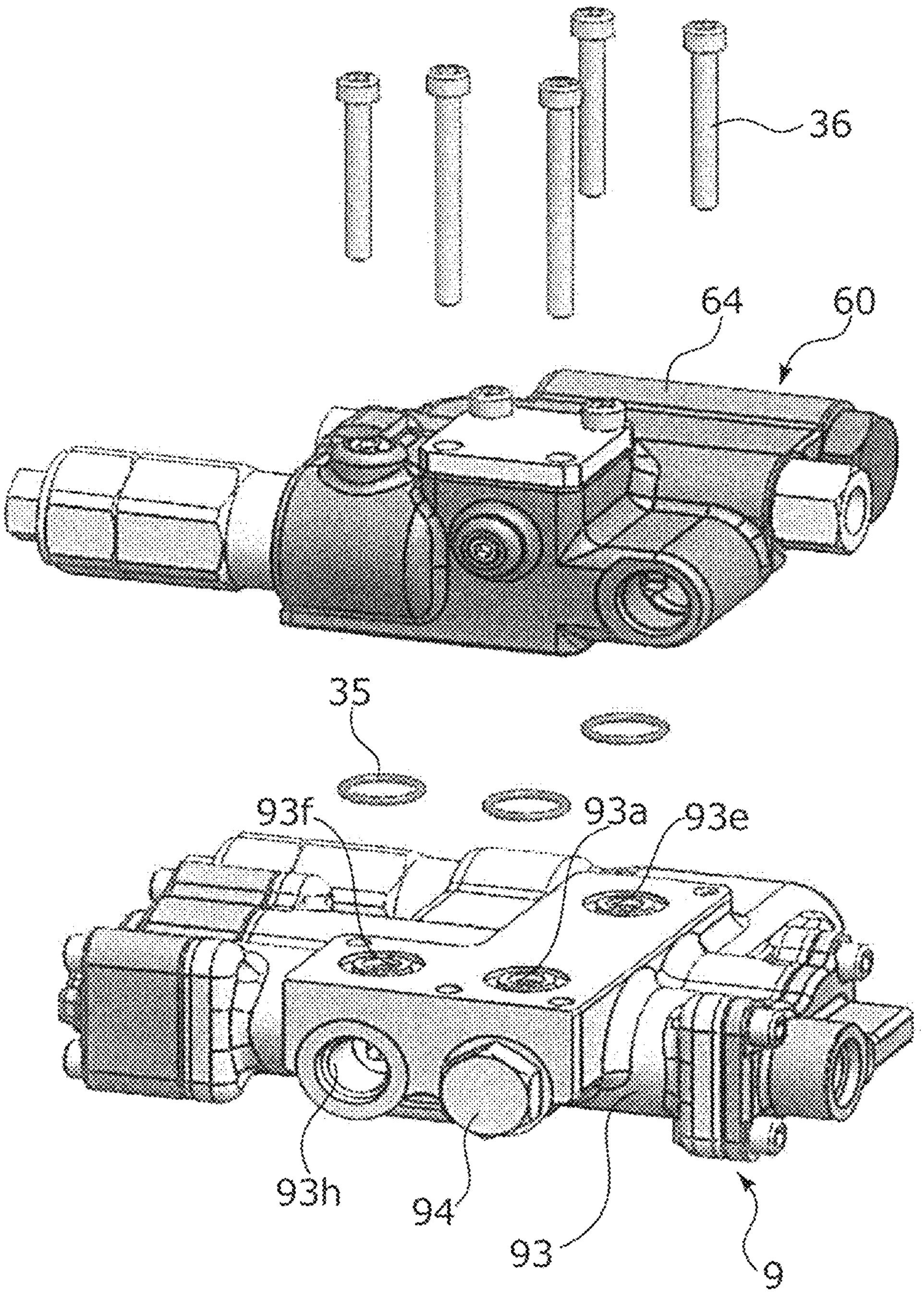
FIG. 10 is an exploded perspective view illustrating a connection mode between the control valve device and the flow diversion valve device in the first embodiment.

In addition, as illustrated in FIG. 10, the housing 93 of the flow diversion valve device 9 and the housing 64 of the control valve device 60 are separate bodies, and are fixed by a plurality of bolts 36 in a stacked state. In a state where the housings 93 and 64 are fixed, the ports 93a, 93e, and 93f are connected to the ports 64a, 64b, and 64e, respectively. In addition, the flow diversion valve device 9 is configured such that the flow diversion valve 91 and the flow passages therearound are integrated into a unit, and the control valve device 60 is configured such that the control valve 61, the control switching valve 62, and the flow passages therearound are integrated into a unit. According to this configuration, the degree of freedom in installing the flow diversion valve device 9 or the control valve device 60 is high, and it is easy to perform maintenance such as replacement.

In addition, since respective seal rings 35 are disposed between the ports 93a, 93e, and 93f provided in the housing 93 (refer to FIG. 3) and the ports 64a, 64b, and 64e provided in the housing 64 (refer to FIG. 4), the oil can be prevented from leaking from gaps.

In addition, since a surface of the housing 93 in which the ports 93a, 93e, and 93f are provided and a surface of the housing 64 in which the ports 64a, 64b, and 64e are provided are flat surfaces, and the housing 93 and the housing 64 are fixed in a state where the surfaces are in contact with each other, the housing 93 and the housing 64 can be stably stacked and fixed, and there is no need for connection pipes connecting the ports 93a, 93e, and 93f and the ports 64a, 64b, and 64e, so that the structure can be simplified. Further, since the housing 93 and the housing 64 are configured such that a plurality (three in the present embodiment) of ports are provided in the same surface, a plurality of flow passages can be easily formed by stacking and fixing the housing 93 and the housing 64.

Second Embodiment

Next, a fluid pressure circuit according to a second embodiment of the present invention will be described with reference to FIG. 11. Incidentally, the description of configurations that are the same as and overlap with the configurations of the first embodiment will be omitted.

Figure 11:
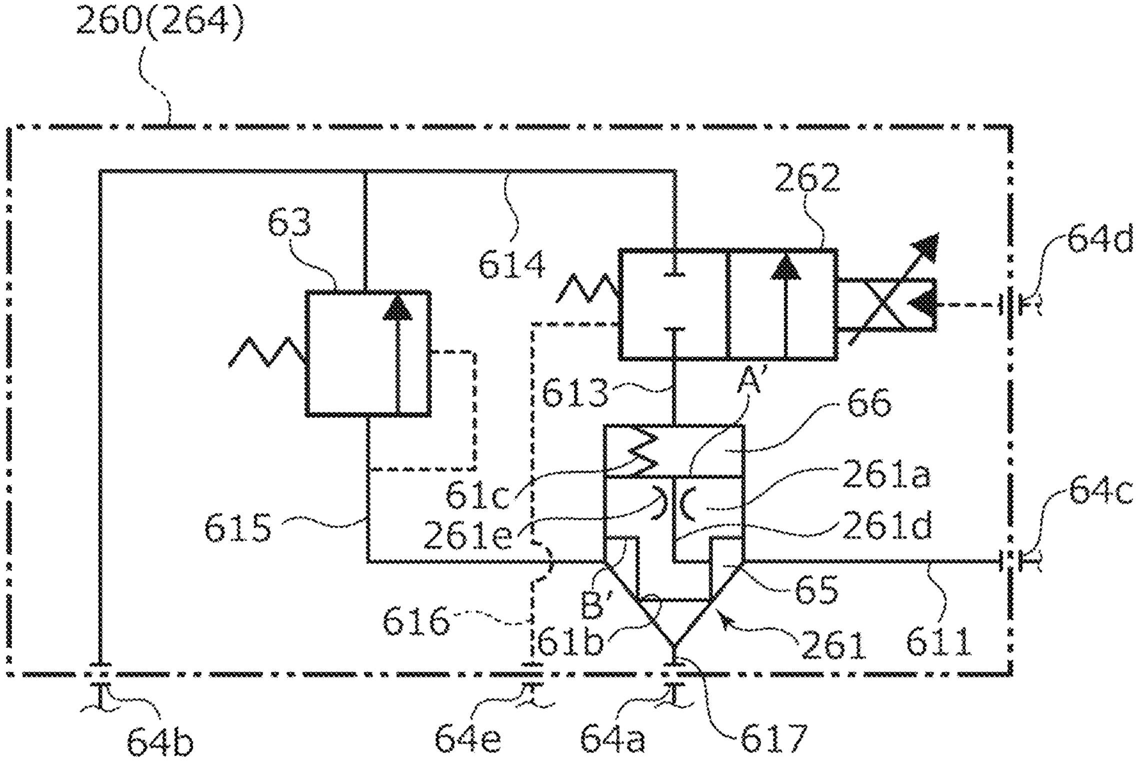
FIG. 11 is a main part enlarged diagram illustrating a control valve device of a hydraulic circuit as a fluid pressure circuit according to a second embodiment of the present invention.

As illustrated in FIG. 11, a control valve device 260 of the hydraulic circuit of the second embodiment differs from that of the first embodiment in configurations of a control valve 261 and a control switching valve 262 and in that a housing 264 is not provided with the flow passage 612, and the configurations are the same in other points.

A valve body 261a of the control valve 261 is provided with a flow passage 261d communicating the first oil chamber 65 and the second oil chamber 66, and the flow passage 261d is restricted by an orifice 261e.

The control switching valve 262 shuts off communication between the flow passage 613 and the flow passage 614 when in a neutral position, and allows communication between the flow passage 613 and the flow passage 614 when in a switching position.

An area A' of a large-diameter portion of the valve body 261a is larger than an annular area B' on the opposite side.

$$A' > B' \qquad \text{Equation (4)}$$

When the control switching valve 262 is in the neutral position, the oil in the first oil chamber 65 is introduced into the second oil chamber 66 through the flow passage 261d, and the first oil chamber 65 and the second oil chamber 66 have substantially the same pressure. When the pressure in the first oil chamber 65 and the second oil chamber 66 is Pc' and the biasing force of the spring 61c is Fs', a force (A'·Pc'+Fs') acting in a direction in which the valve body 261a is pressed against the seat 61b side is larger than a force (B'·Pc') acting in a direction in which the valve body 261a is separated from the seat 61b.

$$A' \cdot Pc' + Fs' > B' \cdot Pc' \qquad \text{Equation (5)}$$

Therefore, the valve body 261a is pressed against the seat 61b, communication between the flow passage 611 and the flow passage 617 is shut off, and the oil does not flow from the flow passage 611 to the flow passage 617.

On the other hand, when the control switching valve 262 is in the switching position, the flow passage 613 and the flow passage 614 communicate with each other, and the second oil chamber 66 communicates with the tank 8. When the second oil chamber 66 communicates with the tank 8, the oil in the first oil chamber 65 flows into the second oil chamber 66 via the flow passage 261*d*. Namely, a differential pressure occurs between the pressure Pc' in the first oil chamber 65 and the pressure Pd' in the second oil chamber 66.

Here, when the differential pressure across the orifice 261*e* is ΔP, the flow rate of the flowing oil is Q, and the opening degree of the orifice is S, the following equation is established by the orifice equation.

$$Q = K \cdot S \cdot \sqrt{\Delta P}, \text{ here } K: \text{constant} \qquad \text{Equation (6)}$$

Since the pressure Pd' in the second oil chamber 66 becomes the tank pressure, and the tank pressure is substantially zero and has almost no influence on the valve body 261*a*, the relationship between the pressure Pc' in the first oil chamber 65 and the pressure Pd' in the second oil chamber 66 is as follows.

$$Pc' - \Delta P = Pd' = 0$$

Namely, $$Pc' = \Delta P \qquad \text{Equation (7)}$$

In addition, Equation (8) below is derived from above Equations (5) and (7).

$$A' \cdot Pd' + Fs' = Fs' < B' \cdot \Delta P \qquad \text{Equation (8)}$$

In such a manner, by setting the biasing force Fs' of the spring 61*c*, the annular area B', or the differential pressure ΔP between the first oil chamber 65 and the second oil chamber 66, the control valve 261 is opened and the flow passage 611 and the flow passage 617 are allowed to communicate with each other.

In addition, when the hydraulic oil flows from the flow passage 617 toward the flow passage 611 due to the extension operation of the hydraulic cylinder 5, the oil in the second oil chamber 66 flows into the first oil chamber 65 through the flow passage 261*d*, so that the movement of the valve body 261*a* in a valve opening direction is not hindered.

Third Embodiment

Next, a fluid pressure circuit according to a third embodiment of the present invention will be described with reference to FIGS. 12 to 14. Incidentally, the description of configurations that are the same as and overlap with the configurations of the first embodiment will be omitted.

Figure 12:
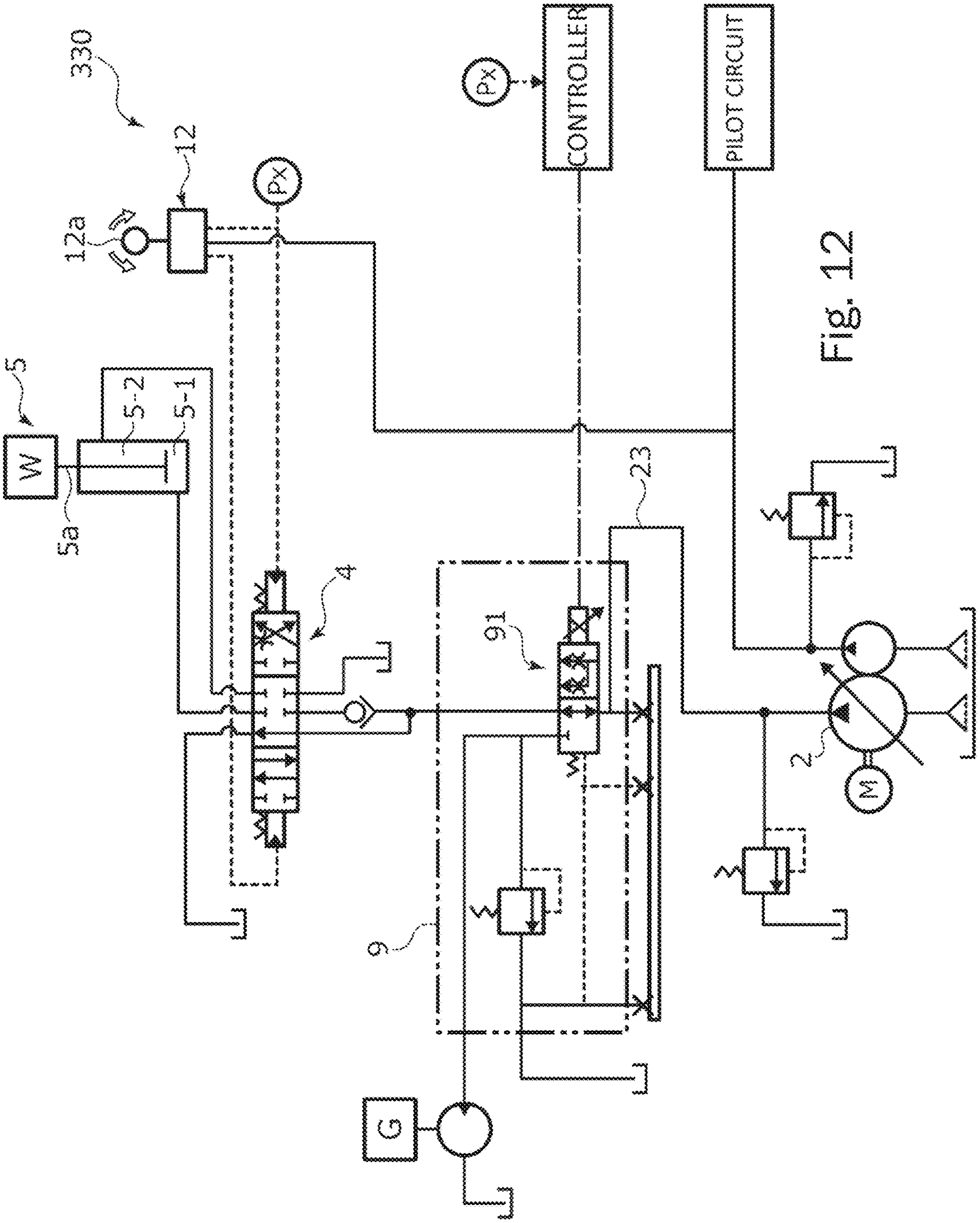
FIG. 12 is a diagram illustrating a hydraulic circuit as a fluid pressure circuit according to a third embodiment of the present invention.
Figure 13:
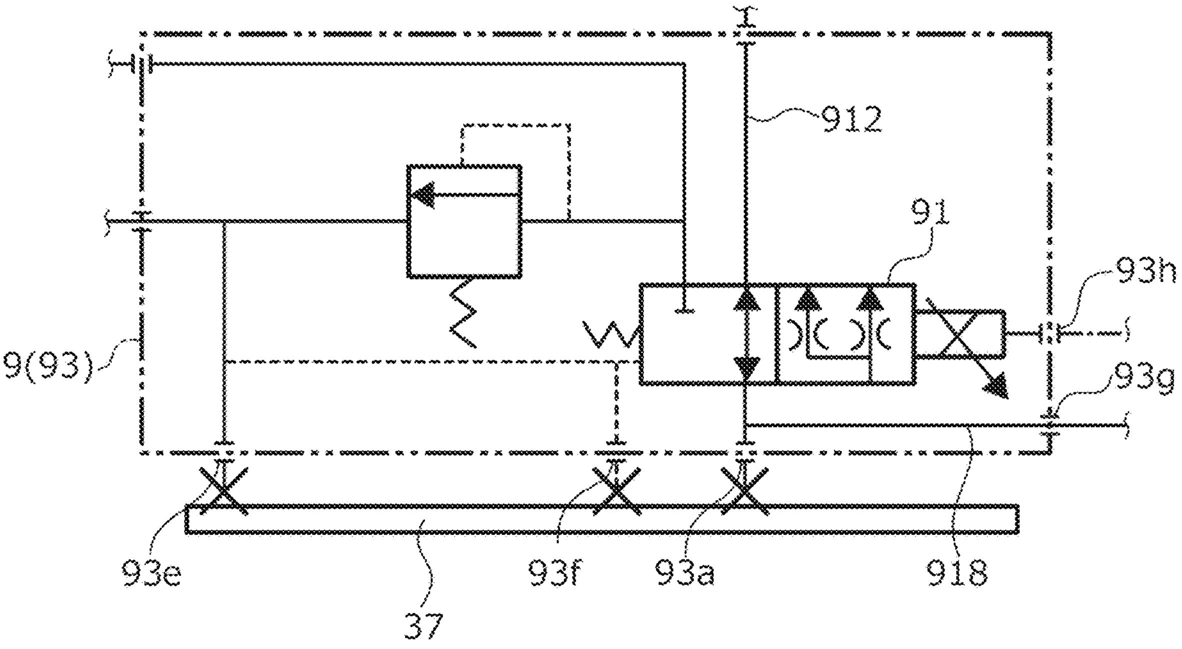
FIG. 13 is a main part enlarged diagram illustrating a flow diversion valve device in the third embodiment.

As illustrated in FIGS. 12 and 13, a hydraulic circuit 330 of the third embodiment has the same configuration as the hydraulic circuit 130 of the first embodiment except that the flow diversion valve device 9 is disposed in the oil passage 23 between the main hydraulic pump 2 and the switching valve 4 and that the control valve device 60 of the first embodiment is not provided.

In the hydraulic circuit 330, the flow diversion valve device 9 is disposed closer to a main hydraulic pump 2 side than the switching valve 4. According to this configuration, even in a case where the flow diversion valve 91 switches from the neutral position to the flow diversion position when the rod 5*a* of the hydraulic cylinder 5 is in an extended state and the operation lever 12*a* of the remote control valve 12 is in the neutral position, the switching valve 4 is in the neutral position, so that the oil in the bottom chamber 5-1 is prevented from being discharged into the tank 8 via the switching valve 4. Therefore, in the hydraulic circuit 330, the configuration of the control valve device 60 of the first embodiment can be omitted.

The flow diversion valve device 9 of the present embodiment is disposed upside down from the state of the first embodiment. In addition, in the present embodiment, the port 93*g* is not closed and is connected to the oil passage 23.

Figure 14:
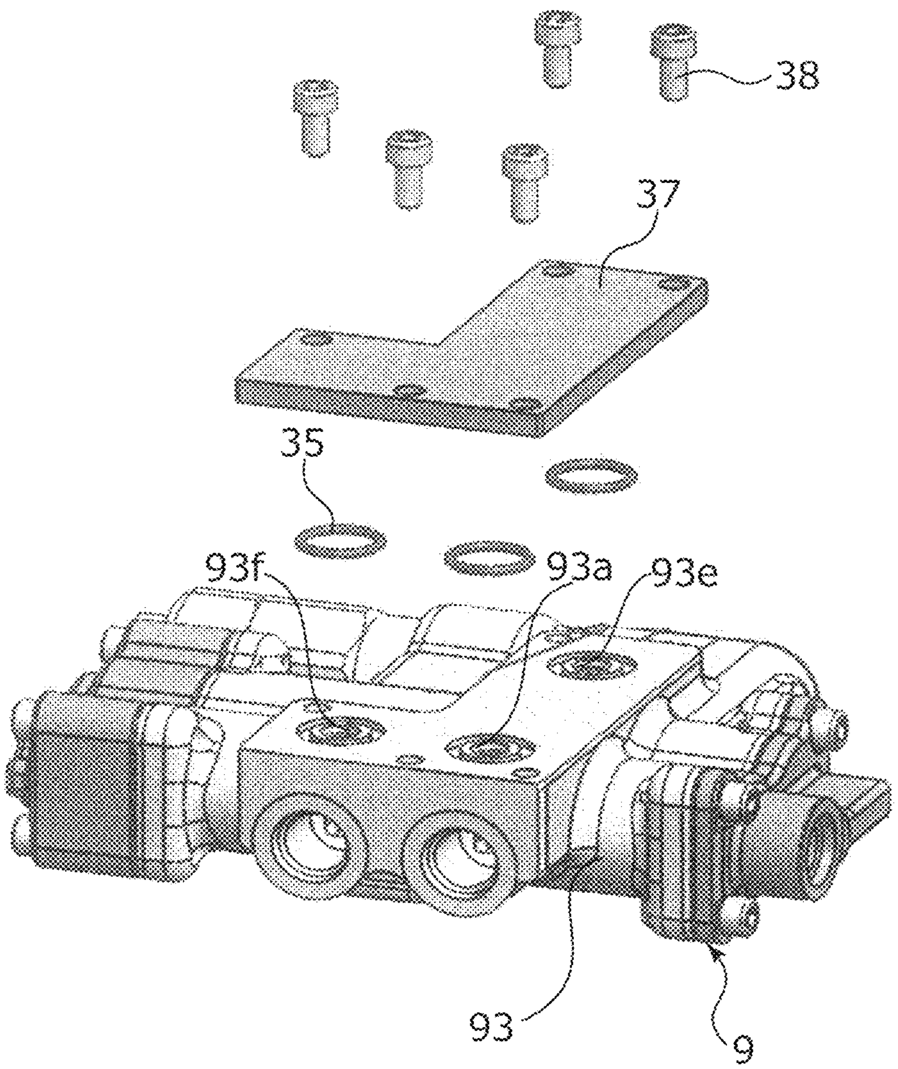
FIG. 14 is an exploded perspective view illustrating a flow diversion valve device in the third embodiment.

In addition, as illustrated in FIGS. 13 and 14, the ports 93*a*, 93*e*, and 93*f* of the housing 93 are closed with a cover member 37 having a plate shape with the seal ring 35 sandwiched therebetween. The cover member 37 is fixed to the housing 93 by a plurality of bolts 38.

In such a manner, by closing the ports 93*a*, 93*e*, and 93*f* of the housing 93 of the flow diversion valve device 9 using the cover member 37, the flow diversion valve device 9 can be used alone, so that design changes such as omitting the configuration of the control valve device 60 can be easily performed. In addition, the cover member may be prepared for each port; however, in the present embodiment, since a plurality of ports can be closed with one cover member 37, the structure is simplified.

The embodiments of the present invention have been described above with reference to the drawings; however, the specific configurations are not limited to the embodiments, and modifications or additions that are made without departing from the scope of the present invention are included in the present invention.

Figure 15:
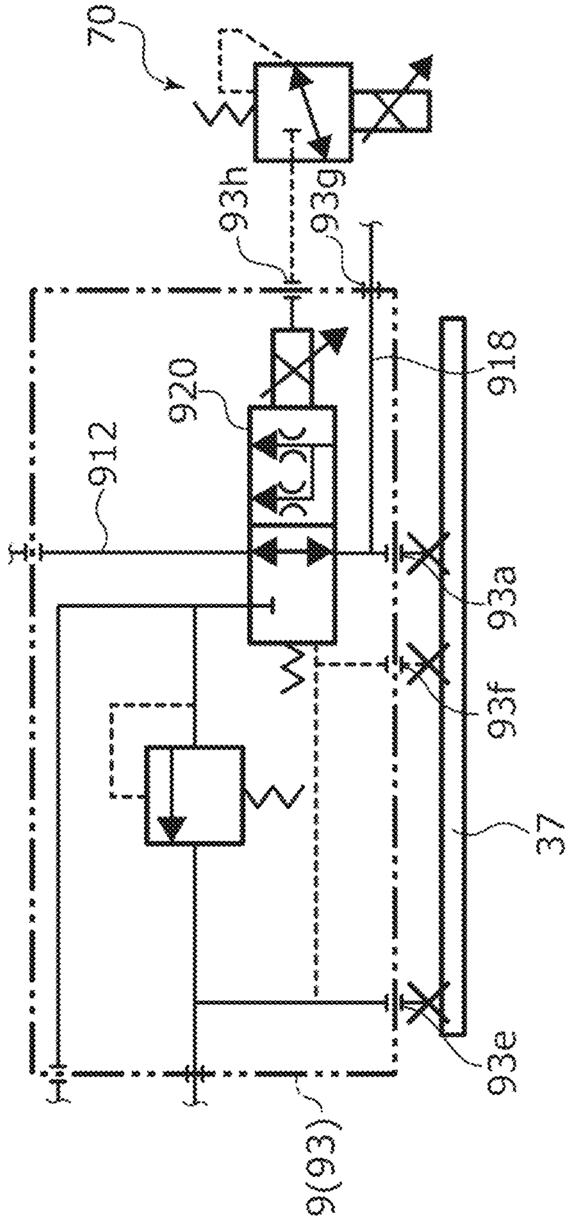
FIG. 15 is a diagram illustrating Modification Example 1 of a flow diversion valve in the embodiments of the present invention.

For example, the mode in which the flow diversion valve of the first to third embodiments is an electromagnetic proportional control valve that is switched by a solenoid has been exemplified; however, for example, as illustrated in Modification Example 1 of FIG. 15, a flow diversion valve 920 may be a pilot actuation type that is actuated by the pilot pressure supplied from the outside via an electromagnetic proportional valve 70.

Figure 16:
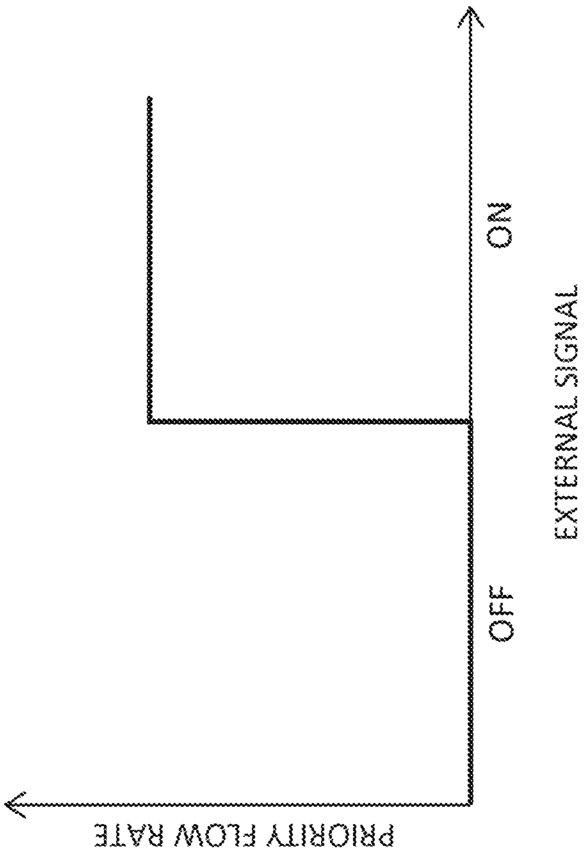
FIG. 16 is a diagram illustrating Modification Example 2 of the flow diversion valve in the embodiments of the present invention.

In addition, the case in which the flow diversion valve of the first to third embodiments is a pressure-compensated electromagnetic proportional control type flow rate adjustment valve capable of variably diverting the priority flow rate in response to an electric signal from the controller 14 has been provided as an example; however, for example, as illustrated in Modification Example 2 of FIG. 16, the diversion of a constant flow rate may be controlled by turning on and off an external signal.

In addition, in the first and second embodiments, the mode in which the control valve device 60 is disposed in the oil passage 24-2 connecting the bottom chamber 5-1 of the hydraulic cylinder 5 and the flow diversion valve device 9 has been exemplified; however, the control valve may be provided at any position in the return flow passage through which the return fluid flows from the cylinder device to the regenerative motor. For example, the control valve may be provided in the oil passage 30 between the flow diversion valve device 9 and the regenerative motor 10. The modes of the first and second embodiments are more preferable since even in a case where the flow diversion valve device 9 operates erroneously, the return oil is not transmitted to the switching valve 4.

In addition, in the first and second embodiments, the mode in which the control valve is actuated by the pilot pressure and the flow diversion valve is actuated by electricity has been exemplified; however, both the control valve and the flow diversion valve may be actuated by the same pilot pressure, electricity, or the like.

In addition, in the first and second embodiments, the mode in which the control valve is actuated by the same pilot pressure as the switching valve has been exemplified; however, the control valve and the switching valve may actuate in separate flow passages for the pilot fluid. In addition, the control valve and the switching valve may be actuated by different means.

In addition, the switching valve is not limited to being configured to be operated by hydraulic pressure, and may be an electromagnetic proportional throttle valve.

In addition, in the first to third embodiments, the mode in which the control valve and the switching valve are configured in separate housings has been exemplified; however, the control valve and the switching valve may be configured in an integral housing. Incidentally, a method for connecting the housings can be freely changed; however, it is preferable that the housings are detachably connected.

In addition, in the first to third embodiments, the oil has been described as an example of the fluid of the fluid pressure circuit; however, it goes without saying that the present invention can be applied to all fluids such as water or air. Further, the fluid supply source that pressurizes the fluid in the tank is not limited to the hydraulic pump, and can be changed to various types depending on the fluid used in the fluid pressure circuit, for example, may be an air cylinder, an accumulator, or the like.

REFERENCE SIGNS LIST

1 Drive mechanism
2 Main hydraulic pump (fluid supply source)
3 Pilot hydraulic pump
4 Switching valve
5 Hydraulic cylinder (cylinder device)
8 Tank
9 Flow diversion valve device
10 Regenerative motor (regenerative drive source)
11 Generator
12 Remote control valve (operating device)
13 Pressure sensor (actuating device)
14 Controller (actuating device)
24-2 Oil passage (return flow passage)
30 Oil passage (return flow passage)
60 Control valve device
61 Control valve
62 Control switching valve
64 Housing
91 Flow diversion valve
93 Housing
130 Hydraulic circuit (fluid pressure circuit)
260 Control valve device
261 Control valve
330 Hydraulic circuit
920 Flow diversion valve

The invention claimed is:

1. A fluid pressure circuit, comprising:
a tank that is configured to store a fluid;
a fluid supply source configured to supply the fluid in the tank;
a cylinder device extended and retracted by the fluid from the fluid supply source;
a switching valve disposed between the fluid supply source and the cylinder device and configured to switch between flow passages of the fluid;
a flow diversion valve located closer to a side of the cylinder device than the switching valve and configured to divert at least some of a return fluid returning from the cylinder device to the tank;
a regenerative drive source driven in a regenerative mode by the diverted return fluid;
an operating device configured to output a switching command corresponding to an operation to the switching valve; and
an actuating device configured to output a switching command to the flow diversion valve in response to operation of the operating device,
wherein a return flow passage through which the return fluid flows from the cylinder device to the regenerative drive source is provided with a control valve configured to have a closed position in which the return flow passage is closed and an open position in which the return flow passage is opened and to switch between the closed position and the open position in response to the operation of the operating device.

2. The fluid pressure circuit according to claim 1,
wherein the actuating device is configured to detect the operation of the operating device as an electric signal, and to output the switching command to the flow diversion valve.

3. The fluid pressure circuit according to claim 2,
wherein the control valve is configured to be a pilot valve that is switched by a pilot pressure, and the flow diversion valve is an electromagnetic valve that is configured to be switched by electricity.

4. The fluid pressure circuit according to claim 3,
wherein the switching valve is a pilot valve, and
the switching valve and the control valve are configured to be switched by the pilot pressure.

5. The fluid pressure circuit according to claim 2,
wherein the control valve is provided in a flow passage between the cylinder device and the flow diversion valve.

6. The fluid pressure circuit according to claim 2,
wherein a housing of the flow diversion valve and a housing of the control valve are separate bodies, and are configured such that the flow passages are connected by stacking and fixing the housings.

7. The fluid pressure circuit according to claim 1,
wherein the control valve is a pilot valve that is configured to be switched by a pilot pressure, and the flow diversion valve is an electromagnetic valve that is configured to be switched by electricity.

8. The fluid pressure circuit according to claim 7,
wherein the switching valve is a pilot valve, and
the switching valve and the control valve are configured to be switched by the pilot pressure.

9. The fluid pressure circuit according to claim 1,
wherein the control valve is provided in a flow passage between the cylinder device and the flow diversion valve.

10. The fluid pressure circuit according to claim 1, wherein a housing of the flow diversion valve and a housing of the control valve are separate bodies, and are configured such that the flow passages are connected by stacking and fixing the housings.

* * * * *